US009127159B2

(12) United States Patent
Miyatake et al.

(10) Patent No.: US 9,127,159 B2
(45) Date of Patent: Sep. 8, 2015

(54) UNSATURATED ESTER RESIN COMPOSITION, UNSATURATED ESTER-CURED PRODUCT, AND MANUFACTURING METHOD THEREFOR

(75) Inventors: Nobuo Miyatake, Westerlo-Oevel (BE); Sean P. Walsh, Carrboro, NC (US)

(73) Assignee: KANEKA CORPORATION, Osaka (JP)

( * ) Notice: Subject to any disclaimer, the term of this patent is extended or adjusted under 35 U.S.C. 154(b) by 557 days.

(21) Appl. No.: 13/058,591

(22) PCT Filed: Aug. 11, 2009

(86) PCT No.: PCT/JP2009/064196
§ 371 (c)(1),
(2), (4) Date: Apr. 21, 2011

(87) PCT Pub. No.: WO2010/018829
PCT Pub. Date: Feb. 18, 2010

(65) Prior Publication Data
US 2011/0190449 A1 Aug. 4, 2011

Related U.S. Application Data

(60) Provisional application No. 61/088,193, filed on Aug. 12, 2008.

(51) Int. Cl.
*C08L 67/06* (2006.01)
*C08L 63/00* (2006.01)
(Continued)

(52) U.S. Cl.
CPC ............... *C08L 67/06* (2013.01); *C08G 59/506* (2013.01); *C08L 63/00* (2013.01); *C08L 51/00* (2013.01)

(58) Field of Classification Search
CPC ......... C08L 67/06; C08L 63/00; C08L 51/00; C08G 59/506

USPC ......... 523/437, 440, 443, 463, 464, 466, 467, 523/500, 501, 513, 521, 522–526; 528/87, 528/88, 101, 106, 111.3, 112; 525/187, 525/529–532
See application file for complete search history.

(56) References Cited

U.S. PATENT DOCUMENTS 3,231,634 A 1/1966 Wismer et al.
3,634,542 A 1/1972 Dowd et al.
(Continued)

FOREIGN PATENT DOCUMENTS

EP 1632533 A1 3/2006
JP 62-104888 A 5/1987
(Continued)

OTHER PUBLICATIONS

International Search Report of PCT/JP2009/064196, date of mailing Nov. 2, 2009.
(Continued)

*Primary Examiner* — Randy Gulakowski
*Assistant Examiner* — Ha Nguyen
(74) *Attorney, Agent, or Firm* — Westerman, Hattori, Daniels & Adrian, LLP

(57) ABSTRACT

An object of the present invention is to provide a curable resin composition capable of giving a cured product which is excellent in mechanical properties (such as elastic modulus) and toughness. The curable resin composition contains 60 to 99 parts by mass of an unsaturated ester resin, 0.5 to 20 parts by mass of an epoxy resin, and 0.1 to 20 parts by mass of crosslinked rubber particles having a number average particle diameter of 20 nm to 600 nm. The crosslinked rubber particles are obtained by polymerizing a vinyl monomer in the presence of one or more rubber polymers selected from the group consisting of a butadiene rubber, a butadiene-styrene rubber, a butadiene-butyl acrylate rubber, a butyl acrylate rubber and an organosiloxane rubber.

11 Claims, 1 Drawing Sheet

(51) Int. Cl.
*C08L 51/00* (2006.01)
*C08L 53/00* (2006.01)
*C08L 55/00* (2006.01)
*C08G 59/50* (2006.01)

(56) References Cited

U.S. PATENT DOCUMENTS

| | | |
|---|---|---|
| 4,350,789 A | 9/1982 | Rowe et al. |
| 4,419,487 A | 12/1983 | Rowe |
| 5,137,990 A | 8/1992 | Corley |
| 5,248,742 A | 9/1993 | McGarry et al. |
| 2003/0088036 A1 | 5/2003 | Huang et al. |
| 2007/0027233 A1 | 2/2007 | Yamaguchi et al. |
| 2009/0065244 A1* | 3/2009 | Kimura et al. ............ 174/258 |
| 2012/0142820 A1 | 6/2012 | Yamaguchi et al. |

FOREIGN PATENT DOCUMENTS

| | | | |
|---|---|---|---|
| JP | 6-025387 A | | 2/1994 |
| JP | 9-208838 A | | 8/1997 |
| JP | 2008-133329 A | * | 6/2008 |
| JP | 2008-133329 A | | 6/2008 |
| JP | 2008-260787 A | | 10/2008 |

OTHER PUBLICATIONS

Extended Euporean Search Report dated Dec. 16, 2014, issued in corresponding EP Patent Application No. 09806720.0 (5 pages).

* cited by examiner

Magnification X 10,000          1 μm

UNSATURATED ESTER RESIN COMPOSITION, UNSATURATED ESTER-CURED PRODUCT, AND MANUFACTURING METHOD THEREFOR

TECHNICAL FIELD

The present invention relates to an unsaturated ester resin composition capable of giving an unsaturated ester cured product having a good surface state and excellent toughness.

BACKGROUND ART

Unsaturated ester resins have been widely used in various applications such as coating materials and molding compositions containing reinforcements like glass fibers. Meanwhile, cured unsaturated ester resins (hereinafter referred to as "unsaturated ester cured products") are inherently so brittle that toughening is required for practical use.

Heretofore, various techniques have been disclosed to toughen unsaturated ester cured products. For example, there have been disclosed methods of adding flexibilizers such as a conjugated diene polymer (Patent Document 1), a carboxyl-terminated reactive liquid polymer (Patent Document 2), and a vinyl-terminated reactive liquid polymer (Patent Document 3) to an unsaturated ester resin. Although the toughness is improved in the cured products obtained by these methods, they are still inadequate and sometimes deteriorated in other properties such as mechanical properties (such as elastic modulus).

Patent Document 4 discloses a method of adding an epoxy resin to an unsaturated ester resin to prepare a resin composition and then curing the composition using a radical initiator. In this method, however, there are cases where an uncured epoxy resin emerges to the surface of the cured product to deteriorate the surface state (the surface becomes tacky) or the toughness of the cured product cannot be sufficiently improved.

Patent Document 5 discloses a method of adding a radical initiator and an epoxy resin curing agent to a resin composition containing an unsaturated ester resin and an epoxy resin in combination. This method, however, cannot improve the toughness of the unsaturated ester resin notably. In addition, there are also cases where a curing reaction of the epoxy resin is insufficient due to a reaction between the epoxy resin curing agent and a double bond of the unsaturated ester resin, resulting in no improvement in the surface state.

Recent studies (for example, Non-Patent Document 1) report that addition of an acrylonitrile-butadiene-styrene (ABS) resin to an unsaturated ester resin improves the toughness of a cured product to be obtained. However, the method sometimes has to sacrifice the elastic modulus, which is one of the most important properties of cured products.

PRIOR ART DOCUMENTS

Patent Documents

Patent Document 1: U.S. Pat. No. 3,231,634
Patent Document 2: U.S. Pat. No. 4,419,487
Patent Document 3: U.S. Pat. No. 4,350,789
Patent Document 4: U.S. Pat. No. 3,634,542
Patent Document 5: U.S. Pat. No. 5,137,990

Non-Patent Document

Non-Patent Document 1: Polymer, vol. 43, 4503-4514 (2002)

DISCLOSURE OF THE INVENTION

Problems to be Solved by the Invention

The present invention has been made in view of the above-mentioned circumstances and an object thereof is to provide a curable resin composition capable of giving a cured product which is excellent in mechanical properties (such as elastic modulus) and toughness and is also good in the surface state.

Means for Solving the Problems

The present inventors have made intensive investigations to find a method of dramatically improving the toughness of a cured product of an unsaturated ester resin composition. In particular, they have made investigations on use of crosslinked rubber particles since use of a rubbery linear polymer may deteriorate mechanical properties such as elastic modulus.

As a result, surprisingly, they have found that a cured product which is good in the surface state, is not reduced in the elastic modulus, and is also notably improved in toughness can be obtained by adding a radical initiator to an unsaturated ester resin composition containing an unsaturated ester resin and an epoxy resin and curing the resulting mixture in the presence of particular crosslinked rubber particles, although the epoxy resin is contained in the resin composition and the radical initiator is thought to be involved only in the crosslinking reaction of the carbon-carbon unsaturated double bond and hardly involved in the curing reaction of the epoxy resin.

More specifically, the unsaturated ester resin composition of the present invention capable of solving the above-mentioned problems contains 60 to 99 parts by mass of an unsaturated ester resin, 0.5 to 20 parts by mass of an epoxy resin, and 0.1 to 20 parts by mass of crosslinked rubber particles having a number average particle diameter of 20 to 600 nm, wherein the crosslinked rubber particles are obtained by polymerizing a vinyl monomer in the presence of one or more rubber polymers selected from the group consisting of a butadiene rubber, a butadiene-styrene rubber, a butadiene-butyl acrylate rubber, a butyl acrylate rubber, and an organosiloxane rubber.

In a preferred embodiment, the crosslinked rubber particles are dispersed in the state of primary particles in the unsaturated ester resin composition of the present invention. In a more preferred embodiment, the crosslinked rubber particles are dispersed in the state of primary particles in the epoxy resin.

Furthermore, also preferred are embodiments in which the unsaturated ester resin composition has a sea-island structure including the epoxy resin as an island part and the unsaturated ester resin as a sea part, or the unsaturated ester resin is composed of 51% to 80% by mass of a curable unsaturated ester compound and 20% to 49% by mass of an ethylenically unsaturated monomer.

The present invention also encompasses a method for producing the unsaturated ester resin composition including the steps of mixing the crosslinked rubber particles with the epoxy resin to give a crosslinked rubber particles-containing epoxy resin and mixing the crosslinked rubber particles-containing epoxy resin with the unsaturated ester resin. The present invention further encompasses a method for producing an unsaturated ester cured product including the step of adding 0.1 to 5 parts by mass of a radical initiator to 100 parts by mass of the unsaturated ester resin composition and curing the resulting mixture.

The present invention also encompasses an unsaturated ester cured product obtained by adding 0.1 to 5 parts by mass of a radical initiator to 100 parts by mass of the unsaturated ester resin composition and curing the resulting mixture. Here, in a preferred embodiment, the crosslinked rubber particles are dispersed in the state of primary particles in the cured product. In a more preferred embodiment, the crosslinked rubber particles are dispersed in the state of primary particles in the epoxy resin. Furthermore, it is also a preferred embodiment that the unsaturated ester cured product has a sea-island structure including the epoxy resin as an island part and the unsaturated ester resin as a sea part.

Effect of the Invention

The unsaturated ester resin composition of the present invention is capable of giving an unsaturated ester cured product which is good in the surface state, is not reduced in the elastic modulus, and is largely improved in toughness since particular crosslinked rubber particles and an epoxy resin are used in combination.

BRIEF DESCRIPTION OF THE DRAWING

FIG. 1 is an electron micrograph of the unsaturated ester cured product of the present invention.

MODE FOR CARRYING OUT THE INVENTION

[Unsaturated Ester Resin Composition]
The unsaturated ester resin composition of the present invention contains 60 to 99 parts by mass of an unsaturated ester resin, 0.5 to 20 parts by mass of an epoxy resin, and 0.1 to 20 parts by mass of crosslinked rubber particles having a number average particle diameter of 20 to 600 nm which are obtained by polymerizing a vinyl monomer in the presence of one or more rubber polymers selected from the group consisting of a butadiene rubber, a butadiene-styrene rubber, a butadiene-butyl acrylate rubber, a butyl acrylate rubber and an organosiloxane rubber. Hereinafter, the unsaturated ester resin composition of the present invention will be described in detail.

(Unsaturated Ester Resin)
The unsaturated ester resin used in the present invention is composed of a curable unsaturated ester compound and an ethylenically unsaturated monomer. From the viewpoint of balance of physical properties, the amount of the curable unsaturated ester compound is preferably 51% to 80% by mass and more preferably 55% to 75% by mass in 100% by mass of the unsaturated ester resin.

Unsaturated ester resins for molding or laminating applications are sold. When using a commercially available unsaturated ester resin in the present invention, it is preferred to select a solution containing about 60% by mass of a curable unsaturated ester compound (and about 40% by mass of an ethylenically unsaturated monomer). For example, DERAKANE (registered trademark) 411-35, which is a vinyl ester resin to be described later, contains 45% of styrene as the ethylenically unsaturated monomer.

<Curable Unsaturated Ester Compound>
The curable unsaturated ester compound is not particularly limited as long as it is a curable compound containing an ethylenic double bond and an ester group. Examples thereof include an unsaturated polyester obtained from a polyhydric alcohol and an unsaturated polyvalent carboxylic acid or an anhydride thereof, and a vinyl ester obtained from an unsaturated monocarboxylic acid and a polyvalent epoxide.

<<Unsaturated Polyester>>
Examples of the polyhydric alcohol include dihydric alcohols having 2 to 12 carbon atoms, such as ethylene glycol, 1,2-propylene glycol, 1,3-propylene glycol, diethylene glycol, di-1,2-propylene glycol, 1,4-butanediol and neopentyl glycol. Dihydric alcohols having 2 to 6 carbon atoms are preferred, and propylene glycol is more preferred. These dihydric alcohols may be used alone, or two or more of them may be used in combination.

Examples of the unsaturated polyvalent carboxylic acid include divalent carboxylic acids having 3 to 12 carbon atoms. Divalent carboxylic acids having 4 to 8 carbon atoms such as fumaric acid and maleic acid are more preferred. These divalent carboxylic acids may be used alone, or two or more of them may be used in combination.

In the present invention, a saturated polyvalent carboxylic acid or an anhydride thereof may be used in combination with the unsaturated polyvalent carboxylic acid or an anhydride thereof. In such a case, it is preferred that the amount of the unsaturated polyvalent carboxylic acid be at least 50% by mole. Examples of the saturated polyvalent carboxylic acid or an anhydride thereof include phthalic anhydride, terephthalic acid, isophthalic acid, adipic acid and glutaric acid. These saturated polyvalent carboxylic acids or anhydrides thereof may be used alone, or two or more of them may be used in combination.

The unsaturated polyester can be obtained by condensing the polyhydric alcohol with the unsaturated polyvalent carboxylic acid or an anhydride thereof in the presence of a catalyst such as an organic titanate (e.g. tetrabutyl titanate) or an organotin compound (e.g. dibutyltin oxide).

The curable unsaturated ester compound can also be commercially available from, for example, Ashland Inc., Reichhold Inc., and AOC.

<<Vinyl Ester>>
Examples of the unsaturated monocarboxylic acid include (meth)acrylic acid and crotonic acid.

Examples of the polyvalent epoxide include bisphenol type epoxy resins (e.g. bisphenol-A and bisphenol-F type epoxy resins) and Novolac type epoxy resins.

Vinyl ester-generating reactions and kinds of the vinyl ester are described in U.S. Pat. No. 3,179,623. For example, a vinyl ester produced by reacting methacrylic acid with a bisphenol-A type epoxy resin or a Novolac type epoxy resin is well known as a typical example.

The vinyl ester can also be commercially available as DERAKANE 411-35 or DERAKANE 470-300 from Ashland Inc.

In the present invention, vinyl esters other than the typical vinyl esters mentioned above may also be used. For example, a urethane-modified vinyl ester available as DION 9800 from Reichhold Inc. can be mentioned.

<Ethylenically Unsaturated Monomer>
The ethylenically unsaturated monomer, which composes the unsaturated ester resin together with the curable unsaturated ester compound, polymerizes with an unsaturated group in an ester main chain to form a polymer chain between crosslinking points. The ethylenically unsaturated monomer also functions as a solvent for the curable unsaturated ester compound and improves handling-ability of the compound. Examples of the ethylenically unsaturated monomer include aromatic group-containing unsaturated monomers such as styrene and methylstyrene(vinyl toluene); nitrile group-containing unsaturated monomers such as acrylonitrile; ester group-containing unsaturated monomers such as methyl acrylate, methyl methacrylate and vinyl acetate; condensation reaction products of polyvalent carboxylic acids such as phthalic acid, adipic acid, maleic acid and malonic acid and unsaturated alcohols such as allyl alcohol; and polyfunctional ester monomers such as allyl cyanurate. These may be used alone or two or more of them may be used in combination. Aromatic group-containing unsaturated monomers such as styrene and methylstyrene are particularly preferred from the viewpoint of physical properties.

(Epoxy Resin)

Since the unsaturated ester resin composition of the present invention contains an epoxy resin, the toughness of a cured product obtained from the composition can be improved. Examples of the epoxy resin include aromatic epoxy resins such as monofunctional or polyfunctional glycidyl ethers of bisphenols (such as bisphenol-A and bisphenol-F); and alicyclic epoxy resins such as 3,4-epoxycyclohexylmethyl-3,4-epoxycyclohexane carboxylate and 3,4-epoxy-6-methyl cyclohexyl methyl-3,4-epoxycyclohexane carboxylate. These epoxy resins may be used alone or two or more of them may be used in combination. A bisphenol-A type epoxy resin is commercially available from Hexion Specialty Chemicals, Inc. as Epon 828 and Dow Chemical Company as DER 331, for example. A bisphenol-F type epoxy resin is commercially available from Hexion Specialty Chemicals, Inc. as Epon 862 or Epon 863, for example.

(Crosslinked Rubber Particles)

Since the unsaturated ester resin composition of the present invention contains crosslinked rubber particles together with the epoxy resin, it is possible to notably improve the toughness of the cured product obtained by curing the composition and to suppress leaching of the epoxy resin to the surface of the cured product. It is also possible to prevent reduction in the inherent elasticity of the unsaturated ester resin.

The crosslinked rubber particles used in the present invention are obtained by polymerizing one or more vinyl monomers in the presence of one or more rubber polymers selected from the group consisting of a butadiene rubber, a butadiene-styrene rubber, a butadiene-butyl acrylate rubber, a butyl acrylate rubber and an organosiloxane rubber. The crosslinked rubber particles can be produced by emulsion polymerization, suspension polymerization, or microsuspension polymerization, for example. From the viewpoint of control of the particle size, the crosslinked rubber particles are preferably produced by emulsion polymerization.

The method of introducing a crosslinked structure into the rubber polymer is not particularly limited and generally used techniques can be employed. For example, there can be mentioned a method of adding a crosslinkable monomer such as a polyfunctional vinyl compound or a mercapto group-containing compound to a rubber polymer and then polymerizing the resulting mixture.

The rubber polymer often has a monolayer structure, but it may have a multilayer structure. When the rubber polymer has a multilayer structure, the polymer composition of the layers may be different from each other.

The crosslinked rubber particles are composed of preferably 55% to 97% by mass, more preferably 70% to 90% by mass of a core polymer which is the rubber polymer and preferably 3% to 45% by mass, more preferably 10% to 30% by mass of a shell polymer which is a polymerization product of the vinyl monomer.

When the content rate of the shell polymer is less than 3% by mass, the crosslinked rubber particles tend to aggregate when handled, which may result in poor operability. Alternatively, when the content rate of the shell polymer exceeds 45% by mass, the content rate of the core polymer in the crosslinked rubber particles decreases and the effect of improving the toughness of the cured product tends to deteriorate.

As the rubber polymer, from the viewpoint of improving the toughness, one or more polymers selected from a butadiene rubber, a butyl acrylate rubber and an organosiloxane rubber are preferred, and a butadiene rubber is more preferred.

Examples of the vinyl monomer include aromatic vinyl monomers such as styrene, α-methylstyrene, p-methylstyrene and divinylbenzene; vinyl cyanide monomers such as acrylonitrile and methacrylonitrile; alkyl(meth)acrylates such as methyl(meth)acrylate, ethyl(meth)acrylate and butyl (meth)acrylate; glycidyl vinyl monomers such as glycidyl (meth)acrylate and glycidyl vinyl ether; hydroxyalkyl(meth) acrylates such as hydroxyethyl(meth)acrylate and hydroxybutyl(meth)acrylate; and divinyl monomers such as ethylene glycol di(meth)acrylate and 1,3-butylene glycol di(meth)acrylate. These vinyl monomers may be used alone or two or more of them may be used in combination.

In the present invention, it is preferred to compose the shell polymer (100 parts by mass) by combining, for example, 25 to 60 parts by mass of styrene, 5 to 45 parts by mass of methyl methacrylate, 5 to 30 parts by mass of acrylonitrile, and 0 to 30 parts by mass of glycidyl methacrylate. With this composition, the desired effect of improving the toughness and the mechanical properties can be realized in a balanced manner.

The crosslinked rubber particles contain a solvent-insoluble matter since the rubber is crosslinked. The amount of the solvent-insoluble matter (that is, gel fraction in terms of the rubber) in the crosslinked rubber particles is obtained by immersing a sample in excess amount of methyl ethyl ketone (MEK) at room temperature for 24 hours, then centrifuging the resultant at 12,000 rpm for 1 hour to remove the soluble matter together with the solvent, and measuring the mass of the remaining MEK-insoluble matter, and is expressed in "% by mass" as the mass ratio of the remaining sample to the charged sample. The amount of the solvent-insoluble matter in the crosslinked rubber particles used in the present invention is preferably 80% to 100% by mass and more preferably 90% to 100% by mass from the viewpoint of obtaining excellent balance of performance.

The number average particle diameter of the crosslinked rubber particles used in the present invention is 20 to 600 nm. From the viewpoint of improving the toughness effectively, it is preferably 50 to 400 nm. The number average particle diameter of the crosslinked rubber particles can be measured by using Microtrack UPA150 (available from Nikkiso Co., Ltd.).

From the viewpoint of improving the toughness of the cured product effectively, making the surface state good, and suppressing the reduction in the elastic modulus, the crosslinked rubber particles of the present invention are preferably dispersed in the unsaturated ester resin composition in the state of primary particles. In this case, it is more preferred that the crosslinked rubber particles be mostly present in the epoxy resin (that is, the crosslinked rubber particles are dispersed in the epoxy resin in the state of primary particles) rather than evenly distributed in the whole unsaturated ester resin composition. Herein, "the state of primary particles" refers to a state where the crosslinked rubber particles having a primary particle diameter of 20 to 600 nm are dispersed without aggregating with being surrounded by the epoxy resin.

In the present invention, part of the crosslinked rubber particles may be present in the unsaturated ester resin composition (particularly in the epoxy resin) in an aggregated state.

(Compounding Ratio)

The unsaturated ester resin composition of the present invention contains 60 to 99 parts by mass of an unsaturated ester resin and 0.5 to 20 parts by mass of an epoxy resin, and is required to further contain 0.1 to 20 parts by mass of crosslinked rubber particles. From the viewpoint of balance between toughness and mechanical properties, it is more preferred that the unsaturated ester resin composition contains 76 to 97 parts by mass of an unsaturated ester resin, 2 to 16 parts by mass of an epoxy resin, and 1 to 8 parts by mass of crosslinked rubber particles.

In other words, the resin composition of the present invention contains, when the amount of the composition (the total amount of the crosslinked rubber particles, the epoxy resin, and the unsaturated ester resin) is 100% by mass, 0.1% to 20% by mass of the crosslinked rubber particles, 0.5% to 20% by mass of the epoxy resin, and 60% to 99.4% by mass of the unsaturated ester resin (a mixture of the curable unsaturated ester compound and the ethylenically unsaturated monomer).

[Production Method of Unsaturated Ester Resin Composition]

In the unsaturated ester resin composition of the present invention, the crosslinked rubber particles are preferably present in the epoxy resin and more preferably dispersed in the epoxy resin in the state of primary particles in order to obtain an unsaturated ester cured product which is good in the surface state, is not reduced in the elastic modulus, and is largely improved in toughness. A method of producing such an unsaturated ester resin composition will be described in the following.

(Production Method of Unsaturated Ester Curable Composition)

The unsaturated ester resin composition of the present invention is preferably produced by the steps of mixing crosslinked rubber particles with an epoxy resin to give a crosslinked rubber particles-containing epoxy resin and mixing the crosslinked rubber particles-containing epoxy resin with an unsaturated ester resin. Through this method, removal of air bubbles from the mixture (resin composition) is facilitated and a great effect of improving the toughness of the cured product can be obtained. The method also allows the crosslinked rubber particles to mostly present in the epoxy resin. Furthermore, the resin composition of the present invention has a sea-island structure in which the epoxy resin containing the crosslinked rubber particles serves as an island part and the unsaturated ester resin serves as a sea part.

Although the crosslinked rubber particles-containing epoxy resin can be obtained by using a method disclosed in prior art (for example, U.S. Pat. No. 4,778,851), it is preferred to obtain the resin through the following steps from the viewpoint of dispersing the crosslinked rubber particles of the present invention in the epoxy resin in the state of primary particles and producing the crosslinked rubber particles-containing epoxy resin speedily and inexpensively to such an extent that the resin can be industrially produced. That is, the crosslinked rubber particles-containing epoxy resin is prepared by a first step of obtaining a loose aggregate of crosslinked rubber particles containing a particular organic solvent, a second step of adding an epoxy resin to the loose aggregate to give a crosslinked rubber particles-dispersed epoxy resin, and a third step of removing the particular organic solvent from the crosslinked rubber particles-dispersed epoxy resin.

In the first step, more specifically, an aqueous medium dispersion liquid, that is, an aqueous medium containing crosslinked rubber particles dispersed therein, is used as a raw material. This raw material is mixed with a particular organic solvent (preferably MEK) having a solubility in water of not lower than 5% by mass and not higher than 40% by mass at 20° C., then, a coagulating agent (preferably an aqueous sodium sulfate solution) and excess water are added to and mixed with the resulting mixture to extract the crosslinked rubber particles in an organic solvent phase, and then a water phase not containing the crosslinked rubber particles is separated and removed. In this manner, an organic solvent phase containing loosely aggregated crosslinked rubber particles (referred to as the "loose aggregate of crosslinked rubber particles") can be obtained. In the present invention, the obtained loose aggregate of crosslinked rubber particles may be repeatedly subjected to the first step. With this operation, impurities (water-soluble impurities) contained in the crosslinked rubber particles can be removed.

[Production Method of Unsaturated Ester Cured Product]

The unsaturated ester cured product of the present invention can be produced by adding a radical initiator to the unsaturated ester resin composition of the present invention and curing the resulting mixture. In this case, the amount of the radical initiator added is 0.1 to 5 parts by mass (preferably 0.5 to 3 parts by mass) to 100 parts by mass of the unsaturated ester resin composition. The radical initiator used in this production method is thought to exclusively act as a curing agent for the unsaturated ester resin since its amount of addition is small.

The method of curing the unsaturated ester resin composition of the present invention is not particularly limited and molding methods generally used in molding a thermosetting resin composition can be mentioned. Examples of the molding method include an infusion method, a resin transfer molding (RTM) method, a pultrusion method, a hand lay-up method, a spray lay-up method and a casting method, in which the resin composition is cured while being molded. In this case, curing while complexing the resin composition with a complexing material such as a fiber or a woven fabric can give a cured product having higher elastic modulus.

Curing conditions are determined in consideration of various factors such as the radical initiator used. For example, the unsaturated ester resin composition of the present invention or a complex thereof may be put in a mold and cured under heating and pressure appropriately selected from the temperature range of 20° C. to 200° C. and the pressure range of 0.5 psi to 250 psi.

(Radical Initiator)

The radical initiator used in the present invention serves both as a curing agent for the unsaturated ester resin and an initiator of the crosslinking reaction of the carbon-carbon unsaturated double bond in the unsaturated ester resin. The radical initiator is used in combination with a curing accelerator or a cocatalyst as necessary.

Examples of the radical initiator include organic peroxides such as benzoyl peroxide, cumene hydroperoxide, dicumyl peroxide, lauroyl peroxide, di-t-butyl peroxide, t-butyl hydroperoxide, methyl ethyl ketone peroxide and t-butyl perbenzoate; and azo compounds such as azobisisobutylonitrile. From the viewpoint of curing the unsaturated ester resin more effectively, one or more initiators selected from the group consisting of benzoyl peroxide, cumene hydroperoxide, dicumyl peroxide and methyl ethyl ketone peroxide are preferred, and cumene hydroperoxide and dicumyl peroxide are more preferred.

The curing accelerator is an additive acting as a catalyst for the decomposition reaction of the radical initiator (radical generation reaction). Examples of the curing accelerator include metal salts (such as a cobalt salt, a tin salt, and a lead salt) of naphthenic acid and octenoic acid, and cobalt naphthenate is preferred from the viewpoint of obtaining good toughness and appearance. When the curing accelerator is added, 0.1 to 1 part by mass of the curing accelerator is preferably added to 100 parts by mass of the unsaturated ester resin composition of the present invention immediately before the reaction (for example, after putting the unsaturated ester resin composition of the present invention in a mold) so as to prevent the curing reaction from occurring rapidly.

The cocatalyst is an additive for making the radical generation reaction occur at a low temperature by promoting decomposition of the radical initiator at a low temperature. Examples of the cocatalyst include amine compounds such as N,N-dimethylaniline, triethylamine and triethanolamine. Among them, N,N-dimethylaniline is preferred since it enables efficient reaction. When the cocatalyst is added, the amount thereof is preferably 0.01 to 0.5 parts by mass to 100 parts by mass of the unsaturated ester resin composition of the present invention or 1 to 15 parts by mass to 100 parts by mass of the radical initiator. The amine compound serves also as a curing agent for the epoxy resin, but use of the amine compound alone is insufficient as an epoxy curing agent since the compound is a tertiary amine and does not contain active hydrogen. Therefore, the amine compound is generally used in combination with a primary or secondary amine curing agent. Accordingly, in the present invention, even in the case where the amine compound is added, the compound is intended to act just as a cocatalyst for the radical initiator.

[Unsaturated Ester Cured Product]

The unsaturated ester cured product of the present invention produced by the above-mentioned method is a cured product containing the crosslinked rubber particles dispersed therein in the state of primary particles (more specifically, the crosslinked rubber particles dispersed in the epoxy resin in the state of primary particles) and which has a sea-island structure in which the epoxy resin serves as an island part and the unsaturated ester resin serves as a sea part. This cured product hardly leaches the epoxy resin and has excellent mechanical properties including fracture toughness.

In the cured product of the present invention, as to suppression of leaching of the epoxy resin to the surface of the cured product, preservation of the inherent elastic modulus of the cured product of the unsaturated ester resin composition, and dramatic improvement in toughness, the mechanisms are not known. However, these are thought to be resulting from the special uniform dispersion state and the sea-island structure.

In other words, the epoxy resin has high affinity to the crosslinked rubber particles and easily localizes around the crosslinked rubber particles and, accordingly, the uniform dispersion state of the crosslinked rubber particles is obtained and leaching of the epoxy resin from the unsaturated ester resin composition can be suppressed. It is inferred that, as a consequence of the above, the unsaturated ester resin composition is sufficiently cured by the use of the radical initiator while preserving the inherent elastic modulus of the unsaturated ester resin as the sea part and the crosslinked rubber particles can exert an excellent effect of improving the toughness.

EXAMPLES

Hereinafter, the present invention will be described in more detail by way of examples and comparative examples, but the present invention is not limited to these examples. Appropriate modifications can be made within the range where they conform to the purposes described above and hereinafter, and such modifications are all encompassed by the technical scope of the present invention. In the following examples and comparative examples, "part(s)" and "%" mean "part (s) by mass" and "% by mass", respectively.

Evaluation Method

First, evaluation methods of the resin compositions and cured products thereof produced according to the examples and comparative examples will be described in the following.

(Solid Content of Latex)

A latex sample obtained after a reaction was dried in a hot air dryer at 120° C. for 1 hour and the solid content was measured based on the remaining amount after drying.

(Amount of Solvent-Insoluble Component (Gel Fraction))

Into 60 ml of methanol, 5 g of a latex was added. The precipitate obtained was centrifuged and dried at 50° C. for 3 hours. The sample thus obtained was immersed in methyl ethyl ketone for 24 hours and centrifuged at 12,000 rpm for 1 hour, and the mass fraction of the methyl ethyl ketone-insoluble matter in the sample was calculated.

(Fracture Toughness)

The fracture toughness G1c was measured at 23° C. by using a notched ¼ inch bar according to ASTM D-5045. The fracture toughness G2c was measured at 23° C. according to the end notched flexure (ENF) test by the load-line displacement measurement described in JIS K 7086.

(Flexural Modulus)

The flexural modulus was measured at 23° C. by using a ¼ inch bar according to ASTM D-790.

Production Example 1

Production of Crosslinked Rubber Particles

Into a 3 L glass reactor, 1,300 g of a rubber latex and 440 g of pure water were charged and the mixture was heated to 70° C. with stirring under nitrogen. This rubber latex contains 480 g of polybutadiene particles having an average particle diameter of 0.1 µm and 1.5% by mass of sodium dodecyl benzene sulfonate relative to 100% by mass of the polybutadiene. After adding 1.2 g of azobisisobutylonitrile thereto, a mixture of 36 g of styrene, 48 g of methyl methacrylate, 24 g of acrylonitrile, and 12 g of glycidyl methacrylate was added to the resultant over 3 hours. Thereafter, the mixture was stirred for another 2 hours to give a rubber particle latex (latex (A)). The solid content of the latex (A) was 32%. The gel fraction of the latex (A) was 98%, indicating that the rubber particles were crosslinked.

Production Example 2

Production of Dispersion of Latex (A) in Epoxy Resin

Into a 1 L vessel, 340 g of methyl ethyl ketone (MEK) was charged and 273 g of the latex (A) obtained in Production Example 1 was added thereto at 25° C. After well mixing, 126 g of pure water was added and 30 g of a 5% by mass aqueous solution of sodium sulfate was added with stirring. After stopping the stirring, the mixture was separated into a water phase and an MEK phase. The water phase was removed and 90 g of MEK was added to the remaining MEK phase. Thereafter, 302 g of pure water was added with stirring and 30 g of a 5% by mass aqueous solution of sodium sulfate was further added. After stopping the stirring, the mixture was separated into a water phase and an MEK phase. The water phase was removed and subsequently the remaining MEK phase was mixed with 204 g of a bisphenol-A type epoxy resin (Epon 828: available from Hexion Specialty Chemicals, Inc.) as an epoxy resin. MEK was removed from the mixture by using a rotary evaporator. In this way, a dispersion (dispersion (B)) of the latex (A) in the bisphenol-A type epoxy resin was obtained. The dispersion (B) (100% by mass) was composed of 70% by mass of the epoxy resin and 30% by mass of crosslinked rubber particles.

In order to examine the degree of dispersion of the rubber particles, piperidine was added to the dispersion and the mixture was cured at 120° C. for 16 hours. The appearance of the obtained cured product was transparent. From this fact, it can be understood that the crosslinked rubber particles were completely primarily dispersed in the epoxy resin.

Example 1

The dispersion (B) was mixed with a bisphenol-A type epoxy vinyl ester resin (DERAKANE 411-350 available from Ashland Inc.) as an unsaturated ester resin at room temperature to give an unsaturated ester resin composition. DERAKANE 411-350 contains styrene as an ethylenically unsaturated monomer and a reaction product of bisphenol-A type epoxy and methacrylic acid as a curable unsaturated ester compound. In addition, cobalt naphthenate (CoN) as a curing accelerator and cumene hydroperoxide (CHP) as a radical initiator were added to the unsaturated ester resin composition. The amount of addition is shown in Table 1. The obtained mixture was poured into a vertical mold to produce a plate of about 12 cm×12 cm×0.5 cm. Curing at 24° C. for 24 hours and postcuring at 120° C. for 2 hours gave a test panel. Test specimens suitable for each test method were cut out of the test panel and the fracture toughness and flexural modulus were measured. The test results are shown in Table 1.

The test panel was observed with an electron microscope (FIG. 1). It can be understood that, in the unsaturated ester cured product of the present invention, crosslinked rubber particles were uniformly dispersed (in the state of primary particles) in the cured product (more precisely, the epoxy resin) and that the cured product had a sea-island structure composed of an island part (the epoxy resin in which the crosslinked rubber particles were uniformly dispersed) and a sea part (the unsaturated ester resin). It can also be understood that almost 100% of the crosslinked rubber particles were present in the epoxy resin. In the present invention, it is thought that when the cured product is observed with an electron microscope, at least 50% (more preferably at least 60%, further preferably at least 70%) of the crosslinked rubber particles are present in the epoxy resin.

Comparative Example 1

Without using the dispersion (B), only the bisphenol-A type epoxy vinyl ester resin was cured by the same method as in Example 1 to give a test specimen. The test results of the test specimen are shown in Table 1.

Comparative Example 2

Instead of the dispersion (B), a bisphenol-A type epoxy resin (Epon 828 available from Hexion Specialty Chemicals, Inc.) was added and the mixture was cured by the same method as in Example 1 to give a test specimen. The test results of the test specimen are shown in Table 1.

TABLE 1

|  |  | component | Example 1 | Comparative Example 1 | Comparative Example 2 |
|---|---|---|---|---|---|
| amount of addition (part) |  | DERAKANE 411-350 | 94 | 100 | 95.8 |
|  |  | dispersion (B) | 6 | — | — |
|  |  | Epon 828 | — | — | 4.2 |
|  |  | CoN | 0.4 | 0.4 | 0.4 |
|  |  | CHP | 1.5 | 1.5 | 1.5 |
| content rate (%) | unsaturated ester resin | bisphenol-A type epoxy vinyl ester | 50.7 | 54 | 51.7 |
|  |  | styrene | 41.5 | 44.1 | 42.3 |
|  |  | crosslinked rubber particle | 1.8 | — | — |
|  | epoxy resin | bisphenol-A type epoxy resin | 4.1 | — | 4.1 |
|  | curing accelaerator | CoN | 0.4 | 0.4 | 0.4 |
|  | radical initiator | CHP | 1.5 | 1.5 | 1.5 |
| property |  | Surface Condition | Good | Good | Bad (tacky) |
|  |  | Fracture Toughness G1c (J/m$^2$) | 300 | 95 | 71 |
|  |  | Flexural Modulus (GPa) | 3.37 | 3.02 | 2.58 |

It can be understood from the results that the cured product of the present invention is improved in toughness and elastic modulus.

Example 2

The dispersion (B) was mixed with a urethane-modified vinyl ester resin (DION 9800-05A available from Reichhold Inc.) as an unsaturated ester resin at room temperature to give an unsaturated ester resin composition. DION 9800-05A contains styrene as an ethylenically unsaturated monomer and a urethane-modified vinyl ester resin as a curable unsaturated ester compound. In addition, benzoyl peroxide (BPO) as a radical initiator was added to the unsaturated ester resin composition. The amount of addition is shown in Table 2. The obtained mixture was poured into a vertical mold to produce a plate of about 12 cm×12 cm×0.5 cm. Curing at 50° C. for 17 hours and postcuring at 120° C. for 2 hours gave a test panel. Test specimens suitable for each test method were cut out of the test panel and the fracture toughness and flexural modulus were measured. The test results are shown in Table 2.

Comparative Example 3

Without using the dispersion (B), only the urethane-modified vinyl ester resin was cured by the same method as in Example 2 to give a test specimen. The test results of the test specimen are shown in Table 2.

TABLE 2

|  | component | Example 2 | Comparative Example 3 |
|---|---|---|---|
| amount of addition (part) | DION 9800-05A | 94 | 100 |
|  | dispersion (B) | 6 | — |
|  | BPO | 1.5 | 1.5 |
| property | Fracture Toughness G1c (J/m$^2$) | 460 | 160 |
|  | Flexural Modulus (GPa) | 3.27 | 2.96 |

It can be understood from the results that the cured product of the present invention is improved in toughness and elastic modulus.

Example 3

The dispersion (B) was mixed with an unsaturated ester resin (Polylite X3641-61 available from Reichhold Inc.) at room temperature to give an unsaturated ester resin composition. Polylite X3641-61 contains styrene as an ethylenically unsaturated monomer and a curable unsaturated ester compound. In addition, benzoyl peroxide (BPO) as a radical initiator was added to the mixture. The amount of addition is shown in Table 3. The obtained mixture was poured into a vertical mold to produce a plate of about 12 cm×12 cm×0.5 cm. Curing at 50° C. for 17 hours and postcuring at 120° C. for 2 hours gave a test panel. Test specimens suitable for each test method were cut out of the test panel and the fracture toughness and flexural modulus were measured. The test results are shown in Table 3.

Comparative Example 4

Without using the dispersion (B), only the unsaturated ester resin was cured by the same method as in Example 3 to give a test specimen. The test results of the test specimen are shown in Table 3.

TABLE 3

|  | component | Example 3 | Comparative Example 4 |
|---|---|---|---|
| amount of addition (part) | DION 9800-05A | 94 | 100 |
|  | dispersion (B) | 6 | — |
|  | BPO | 1.5 | 1.5 |
| property | Fracture Toughness G1c (J/m$^2$) | 122 | 86 |
|  | Flexural Modulus (GPa) | 3.39 | 3.28 |

It can be understood from the results that the toughness and elastic modulus are improved by the present invention.

Example 4

The dispersion (B) was mixed with a bisphenol-A type epoxy vinyl ester resin (DERAKANE 411-350 available from Ashland Inc.) as an unsaturated ester resin at room temperature to give an unsaturated ester resin composition. In addition, cobalt naphthenate (CoN) as a curing accelerator and methyl ethyl ketone peroxide (MEKP) as a radical initiator were added to the unsaturated ester resin composition. The amount of addition is shown in Table 4. The obtained mixture was applied to a glass fiber cloth (unidirectional E-glass) layer by using a brush. When the glass fiber cloth got wet sufficiently, another glass fiber cloth layer was placed on the sufficiently wet glass fiber cloth and the obtained mixture was applied thereto using a brush. This procedure was repeated until the number of layers of the glass fiber cloths became 16 to give a laminate. The laminate was sandwiched between two glass plates and cured at 24° C. for 24 hours and post-cured at 100° C. for 4 hours to give a test panel. Test specimens suitable for each test method were cut out of the test panel and the fracture toughness was measured. The test results are shown in Table 4.

Comparative Example 5

Without using the dispersion (B), only the bisphenol-A type epoxy vinyl ester resin was cured by the same method as in Example 4 to give a test specimen. The test results of the test specimen are shown in Table 4.

TABLE 4

|  | component | Example 4 | Comparative Example 5 |
|---|---|---|---|
| amount of addition (part) | DERAKANE 411-350 | 94 | 100 |
|  | dispersion (B) | 6 | — |
|  | CoN | 0.4 | 0.4 |
|  | MEKP | 0.75 | 0.75 |
| property | Fracture Toughness G2c (J/m$^2$) | 2950 | 2500 |

It can be understood from the results that the cured product of the present invention is improved in toughness.

The invention claimed is:

1. An unsaturated ester resin composition comprising
   60 to 99 parts by mass of an unsaturated ester resin, wherein the unsaturated ester resin comprises (1) a vinyl ester obtained from an unsaturated monocarboxylic acid and a polyvalent epoxide, and an ethylenically unsaturated monomer, or (2) an unsaturated polyester obtained from a polyhydric alcohol and an unsaturated polyvalent carboxylic acid or an anhydride thereof, and the ethylenically unsaturated monomer,
   0.5 to 20 parts by mass of an epoxy resin,
   0.1 to 20 parts by mass of crosslinked rubber particles having a number average particle diameter of 20 nm to 600 nm, wherein the crosslinked rubber particles are obtained by polymerizing a vinyl monomer in the presence of one or more rubber polymers selected from the group consisting of a butadiene rubber, a butadiene-styrene rubber, a butadiene-butyl acrylate rubber, a butyl acrylate rubber, and an organosiloxane rubber, and
   the unsaturated ester resin composition is produced by a method comprising:
   mixing an aqueous medium containing crosslinked rubber particles dispersed therein with an organic solvent having a solubility in water of not lower than 5% by mass and not higher than 40% by mass at 20° C.,
   mixing excess water with the resulting mixture to extract the crosslinked rubber particles in an organic solvent phase,
   removing a water phase not containing the crosslinked rubber particles to obtain a loose aggregate of crosslinked rubber particles containing an organic solvent,
   adding an epoxy resin to the loose aggregate to give a crosslinked rubber particles-dispersed epoxy resin, removing the organic solvent from the crosslinked rubber particles-dispersed epoxy resin to obtain the crosslinked rubber particles-containing epoxy resin, and mixing the crosslinked rubber particles-containing epoxy resin with the unsaturated ester resin.

2. The unsaturated ester resin composition according to claim 1, wherein the crosslinked rubber particles are dispersed in the state of primary particles.

3. The unsaturated ester resin composition according to claim 1, wherein the crosslinked rubber particles are dispersed in the state of primary particles in the epoxy resin after the curing of the unsaturated ester resin composition.

4. The unsaturated ester resin composition according to claim 1, which has a sea-island structure including the epoxy resin as an island part and the unsaturated ester resin as a sea part after the curing of the unsaturated ester resin composition.

5. The unsaturated ester resin composition according to claim 1, wherein the unsaturated ester resin is composed of 51% to 80% by mass of (1) the vinyl ester obtained from an unsaturated monocarboxylic acid and a polyvalent epoxide, or (2) the unsaturated polyester obtained from a polyhydric alcohol and an unsaturated polyvalent carboxylic acid or an anhydride thereof, and 20% to 49% by mass of the ethylenically unsaturated monomer.

6. A method for producing an unsaturated ester cured product, comprising:

adding 0.1 to 5 parts by mass of a radical initiator to 100 parts by mass of the unsaturated ester resin composition according to claim 1 and curing the resulting mixture.

7. An unsaturated ester cured product obtained by adding 0.1 to 5 parts by mass of a radical initiator to 100 parts by mass of the unsaturated ester resin composition according to claim 1, and curing the resulting mixture.

8. The unsaturated ester cured product according to claim 7, wherein the crosslinked rubber particles are dispersed in the state of primary particles.

9. The unsaturated ester cured product according to claim 7, wherein the crosslinked rubber particles are dispersed in the state of primary particles in the epoxy resin.

10. The unsaturated ester cured product according to claim 7, which has a sea-island structure including the epoxy resin as an island part and the unsaturated ester resin as a sea part.

11. The unsaturated ester resin composition according to claim 1, which consists of the unsaturated ester resin, the epoxy resin, the crosslinked rubber particles, and a radical initiator and/or a curing accelerator.

\* \* \* \* \*